US006774653B2

(12) United States Patent
Gold et al.

(10) Patent No.: US 6,774,653 B2
(45) Date of Patent: Aug. 10, 2004

(54) TWO-PIN THERMAL SENSOR CALIBRATION INTERFACE

(75) Inventors: Spencer M. Gold, Pepperell, MA (US); Kenneth House, Arlington, MA (US); Claude R. Gauthier, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 44 days.

(21) Appl. No.: 09/935,385

(22) Filed: Aug. 22, 2001

(65) Prior Publication Data

US 2003/0038648 A1 Feb. 27, 2003

(51) Int. Cl.[7] .......................... G01R 31/02; G01K 1/08
(52) U.S. Cl. ...................................... 324/760; 702/132
(58) Field of Search ............................... 324/760, 153; 702/132, 99, 104, 130, 176, 182, 183

(56) References Cited

U.S. PATENT DOCUMENTS

| | | | |
|---|---|---|---|
| 3,379,214 A | 4/1968 | Weinberg | 137/625.5 |
| 4,165,642 A | 8/1979 | Lipp | 73/362 SC |
| 4,201,087 A | 5/1980 | Akita et al. | 73/339 A |
| 4,305,041 A | 12/1981 | Frerking | 328/155 |
| 4,371,271 A | 2/1983 | Bellet | 374/183 |
| 4,551,031 A | 11/1985 | Ishikawa et al. | 374/117 |
| 4,559,954 A | 12/1985 | Murase | 128/736 |
| 4,658,407 A | 4/1987 | Iwama | 377/25 |
| 4,692,710 A | 9/1987 | Shvartsman | 328/111 |
| 4,754,760 A | 7/1988 | Fukukita et al. | 128/660 |
| 4,905,701 A | 3/1990 | Cornelius | 128/660.01 |
| 5,085,526 A | 2/1992 | Sawtell et al. | 374/101 |
| 5,097,198 A | 3/1992 | Holmdahl | 323/280 |
| 5,193,387 A | 3/1993 | Hodate | 73/146.5 |
| 5,214,668 A | 5/1993 | Satou et al. | 374/117 |
| 5,291,607 A | 3/1994 | Ristic et al. | 395/750 |
| 5,485,127 A | 1/1996 | Bertoluzzi et al. | 331/69 |
| 5,490,059 A | 2/1996 | Mahalingaiah et al. | 364/166 |
| 5,546,810 A | 8/1996 | Arikawa et al. | 73/702 |
| 5,626,425 A | 5/1997 | Fujikawa et al. | 374/163 |
| 5,638,418 A | 6/1997 | Douglass et al. | 377/25 |
| 5,781,075 A | 7/1998 | Bolton, Jr. et al. | 331/176 |
| 5,781,718 A | 7/1998 | Nguyen | 395/183.09 |
| 5,832,048 A | 11/1998 | Woodman, Jr. | 375/376 |
| 5,836,691 A | 11/1998 | Yamauchi | 374/117 |
| 5,838,578 A | 11/1998 | Pippin | 364/488 |
| 5,870,614 A | 2/1999 | Ang | 395/750.03 |
| 5,873,053 A | 2/1999 | Pricer et al. | 702/130 |
| 5,892,408 A | 4/1999 | Binder | 331/44 |
| 5,892,448 A | 4/1999 | Fujikawa et al. | 340/584 |
| 5,933,039 A | 8/1999 | Hui et al. | 327/262 |
| 5,953,640 A | 9/1999 | Meador et al. | 455/73 |

(List continued on next page.)

OTHER PUBLICATIONS

Dallas Semiconductor, Application Note 105, "High Resolution Temperature Mesurement With Dallas Direct–to–Digital Temperature Sensors" Retrieved from the Internet, www.dalsemi.com, pp. 1–20 (Aug. 11, 1999).

Dallas Semiconductor, Product Guide, "DS1721 2–Wire Digital Thermometer and Thermostat" pp. 1–14 (Dec. 29, 1998).

Gunther et al. "Managing the impact of increasing microprocessor power consumption." pp. 1–9 http://www.intel.com/technology/iti/q12001/articles/art 4.htm (2001) Intel Technology Journal Q1.

(List continued on next page.)

*Primary Examiner*—Kamand Cuneo
*Assistant Examiner*—Paresh Patel
(74) *Attorney, Agent, or Firm*—Lahive & Cockfield, LLP

(57) ABSTRACT

A sensor and method are provided for sensing a physical stimulus in an integrated amount, such as thermal energy and produce a signal that indicates a quantitative value of the physical stimulus along with a value that indicates the operability of the sensor and a value that indicates a sense operation is in process. The sensor and method minimize the number of input and output pins necessary for a sensor to report a measurement response of a physical stimulus.

16 Claims, 3 Drawing Sheets

U.S. PATENT DOCUMENTS

| | | | | | |
|---|---|---|---|---|---|
| 6,091,255 | A | * | 7/2000 | Godfrey | 324/760 |
| 6,098,030 | A | | 8/2000 | McMinn | 702/132 |
| 6,115,441 | A | | 9/2000 | Douglass et al. | 377/25 |
| 6,219,723 | B1 | | 4/2001 | Hetherington et al. | 710/18 |
| 6,362,699 | B1 | | 3/2002 | Fry | 331/176 |
| 6,363,490 | B1 | | 3/2002 | Senyk | 713/300 |
| 6,463,396 | B1 | | 10/2002 | Nishigaki | 702/132 |
| 2001/0021217 | A1 | | 9/2001 | Gunther et al. | 374/178 |
| 2003/0052331 | A1 | | 3/2003 | Gauthier et al. | 257/168 |
| 2003/0155903 | A1 | | 8/2003 | Gauthier et al. | 324/73.41 |
| 2003/0155964 | A1 | | 8/2003 | Gauthier et al. | 327/540 |
| 2003/0155965 | A1 | | 8/2003 | Gauthier et al. | 327/540 |
| 2003/0156622 | A1 | | 8/2003 | Gold et al. | 374/170 |
| 2003/0158683 | A1 | | 8/2003 | Gauthier et al. | 702/99 |
| 2003/0158696 | A1 | | 8/2003 | Gold et al. | 702/132 |
| 2003/0158697 | A1 | | 8/2003 | Gold et al. | 702/132 |

OTHER PUBLICATIONS

Intel Corporation 2000, Product Guide "Intel® Pentium® 4 Processor In the 423–pin Package Thermal Design Guidelines" Order No. :249203–001, pp. 1–28 (Nov. 2000).

Intel Corporation "Mobile Pentium ® II Processor and Pentium II Processor Mobile Module Thermal Sensor Interface specifications." 13 pages (Apr. 1998) http://www.intel.com/design/mobile/applnots/24372401.pdf.

Maxim Integrated Products "Maxim Remote/Local Temperature Sensor with SMBus Serial Interface: MAX1617" pp. 1–20 (Mar. 1998).

* cited by examiner

TWO-PIN THERMAL SENSOR CALIBRATION INTERFACE

TECHNICAL FIELD OF THE INVENTION

The present invention generally relates to an integrated circuit, and more particularly, to a sensor circuit having a serial interface.

BACKGROUND OF THE INVENTION

Temperature gradients across the die of today's high performance very large scale integration (VLSI) components, such as a microprocessor can adversely affect component performance. For example, a temperature variation between two clock driver circuits within a microprocessor often results in system clock skew. Moreover, the die may reach an unacceptable temperature that causes the microprocessor to malfunction or stop functioning.

To protect the microprocessor from thermal damage, a diode is typically placed in the die of the microprocessor to provide a die temperature indication. This diode is driven with a fixed amount of current, and the corresponding voltage drop across the diode provides an indication of the microprocessor temperature. Unfortunately, the diode gives no indication that the diode is operating properly. Moreover, the diode has poor accuracy. The diode provides a temperature reading that is accurate to about ±10° C.

Because there is only a single diode positioned at a single location on the microprocessor die to measure the temperature of the microprocessor, it is difficult to determine the temperature gradient across the microprocessor. Consequently, early indications that a thermal related problem exists in a portion of the microprocessor are difficult to detect. Moreover, given the need to keep microprocessor pinout density to a minimum along with the surface area of the microprocessor, the use of multiple temperature sensors having interfaces external to the microprocessor is prohibitive.

SUMMARY OF THE INVENTION

The present invention addresses the above-described limitations of measuring the temperature of an integrated circuit. The present invention provides an approach to enable a sensor of any type to report a sensed value and to indicate a state of operability via an off chip interface having a minimum number of electrical contacts.

In one embodiment of the present invention, a sensor having a register to hold a response to a sensed physical stimulus and an interface to communicate the response is provided. The sensor communicates the response from the register in a manner that indicates whether the sensor is functioning correctly. The interface is a digital interface having at least two electrical contacts. The first contact receives a trigger to initiate the sense operation and the second electrical contact communicates the sensor response. The sensor communicates its response directly to an apparatus or another integrated circuit, or to another circuit within the integrated circuit the sensor is part of. The sensor provides an absolute or relative value of the sensed physical stimulus. In addition, the sensor communicates via the interface to indicate when the sensor is sensing a physical stimulus.

The above-described approach benefits an integrated circuit that seeks a sensor capable of indicating its operability while keeping the external pin density of the integrated circuit to a minimum. As a result, an integrated circuit can communicate an accurate internal temperature reading from an internal sensor to a device external to the integrated circuit and provide an indication of the sensor's operability as part of the communication without significantly increasing external pin density of the packaged integrated circuit.

In accordance with another aspect of the present invention, a method is performed in a sensor that indicates a sensor status, a response of the sensor and the sensor's operational state. By triggering the sensor to sense a physical stimulus, the sensor reports an indication that a sensing operation is in process, a response to the physical stimulus along with a value that is indicative of the sensor's operational state. The response provided by the sensor has a first portion that is indicative of an absolute or relative value of the sensed physical stimulus and a second portion that is indicative of the operational state of the sensor itself.

The above-described approach benefits a microprocessor architecture that utilizes an active sensor. Because the sensor reports a value indicative of its operational state the microprocessor architecture can be assured that the sensor is operating properly. As a result, the reliability and the confidence of the sensor's response is significantly increased.

In yet another aspect of the present invention, a sensor that reports a response value and a status value when triggered is provided. The sensor includes a serial interface having one input contact and one output contact. The sensor can be a thermal sensor that reports an absolute or relative temperature value.

In still another aspect of the present invention, a method is performed in a very large scale integration (VLSI) circuit for reporting a temperature sensed by a thermal sensor of the VLSI circuit. By triggering the thermal sensor to sense the temperature of the VLSI circuit the thermal sensor senses the die or package temperature of the VLSI circuit and affixes a value to the sensed temperature that indicates whether the sensor is functioning properly. The thermal sensor reports the sensed temperature value with the affixed value to a device either internal to or external to the VLSI circuit. From the affixed value, the receiving device can determine whether the temperature value provided is reliable or unreliable. Moreover, the thermal sensor of the VLSI circuit can sense and report a temperature of the system in which the VLSI circuit operates.

BRIEF DESCRIPTION OF THE DRAWINGS

An illustrative embodiment of the present invention will be described below relative to the following drawings.

DETAILED DESCRIPTION

The illustrative embodiment of the present invention provides a sensor that indicates whether it is functioning properly, whether it is sensing or not and a response to a physical stimulus. In the illustrative embodiment a sensor is adapted to have a serial interface to report three data values in response to a control signal that initiates a sensing process. A first data value indicates whether a sensing operation is in process, a second data value represents a response to the sensed physical stimulus and a third data value indicates whether the sensor is functioning properly.

In the illustrative embodiment, the sensor is attractive for use in integrated circuits that need to keep external pins to a minimum while accurately tracking the temperature of the integrated circuit itself. The sensor allows an integrated circuit, such as a microprocessor, to communicate an accurate temperature value of the circuit in a reliable manner. The illustrative embodiment allows for an active device to be used to sense and report a temperature value along with an indication of the sensor's operability without significantly impacting the surface area or the pinout density of the integrated circuit.

Figure 1:
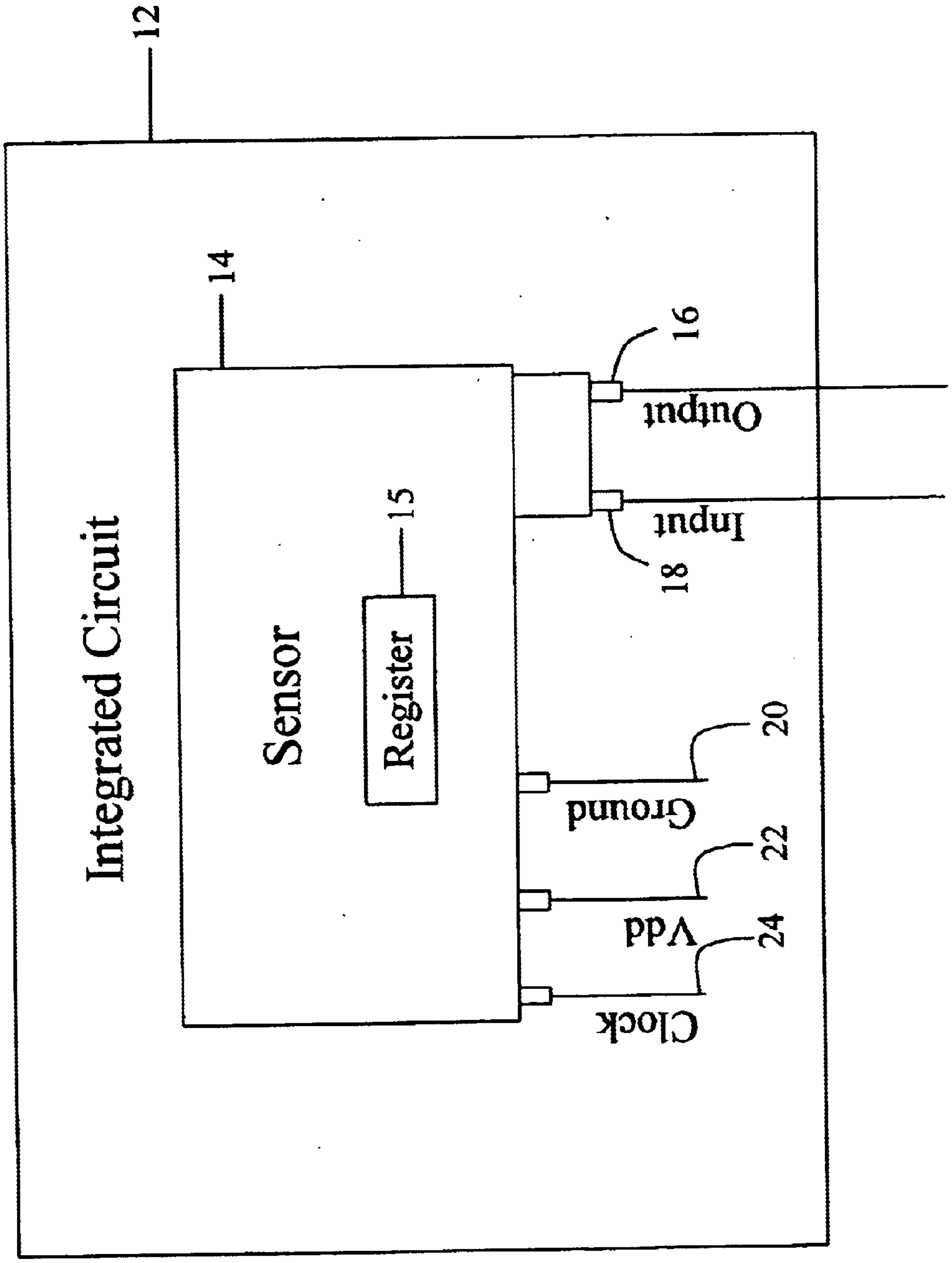
FIG. 1 depicts a block diagram of an integrated circuit suitable for practicing the illustrative embodiment of the present invention.

FIG. 1 is a block diagram of an exemplary integrated circuit 12 that is suitable for practicing the illustrative embodiment of the present invention. The sensor 14 is an active device within the exemplary integrated circuit 12. The sensor 14 includes a register to hold a response to a physical stimulus. Coupled to the sensor 14 are the clock input node 24, the power input node 22, the ground node 20, the input node 18 and the output node 16. Input node 18 and output node 16 provide the sensor 14 with an interface external to the exemplary integrated circuit 12. The power input node 22 is tied to a voltage source that can be controlled independently of the voltage source supplying a voltage level to the remainder of the active devices within the exemplary integrated circuit 12. The clock node 24 receives a clock signal 37 and is coupled to a clock source or driver that can be controlled independently of any other clock source driver within the exemplary integrated circuit 12. As a consequence, the sensor 14 can be operated independently of the exemplary integrated circuit 12 and therefore used to determine a base line temperature of the exemplary integrated circuit 12 for calibration purposes. In this manner, the sensor 14 can be calibrated without having to compensate for the thermal affects of having one or more other active elements within the exemplary integrated circuit 12 active during baselining.

The input node 18 is adapted to receive a digital input signal that triggers the sensor 14 to sense a physical stimulus and report a response corresponding to an absolute or relative value of the physical stimulus. The output node 16 is adapted to communicate a digital signal that includes at least three values to indicate that the sensor 14 is in process of sensing a physical stimulus, the response held by the register 15 along with a data value that indicates whether the sensor 14 is functioning correctly. The operation of the input node 18 and the output node 16 are discussed in more detail with reference to FIGS. 2 and 3.

Those of ordinary skill in the art will recognize that power input node 22 and the clock input node 24 can also be coupled to a common clock node and a common power node within the integrated circuit 12 should a baseline temperature measurement with all operating elements in an off state not be necessary. The ground node 20 typically shares a common ground plane with the exemplary integrated circuit 12. Moreover, those skilled in the art will recognize that the input node 18 and the output node 16 can be adapted to provide the sensor 14 with an interface internal to the exemplary integrated circuit 12.

Figure 2:
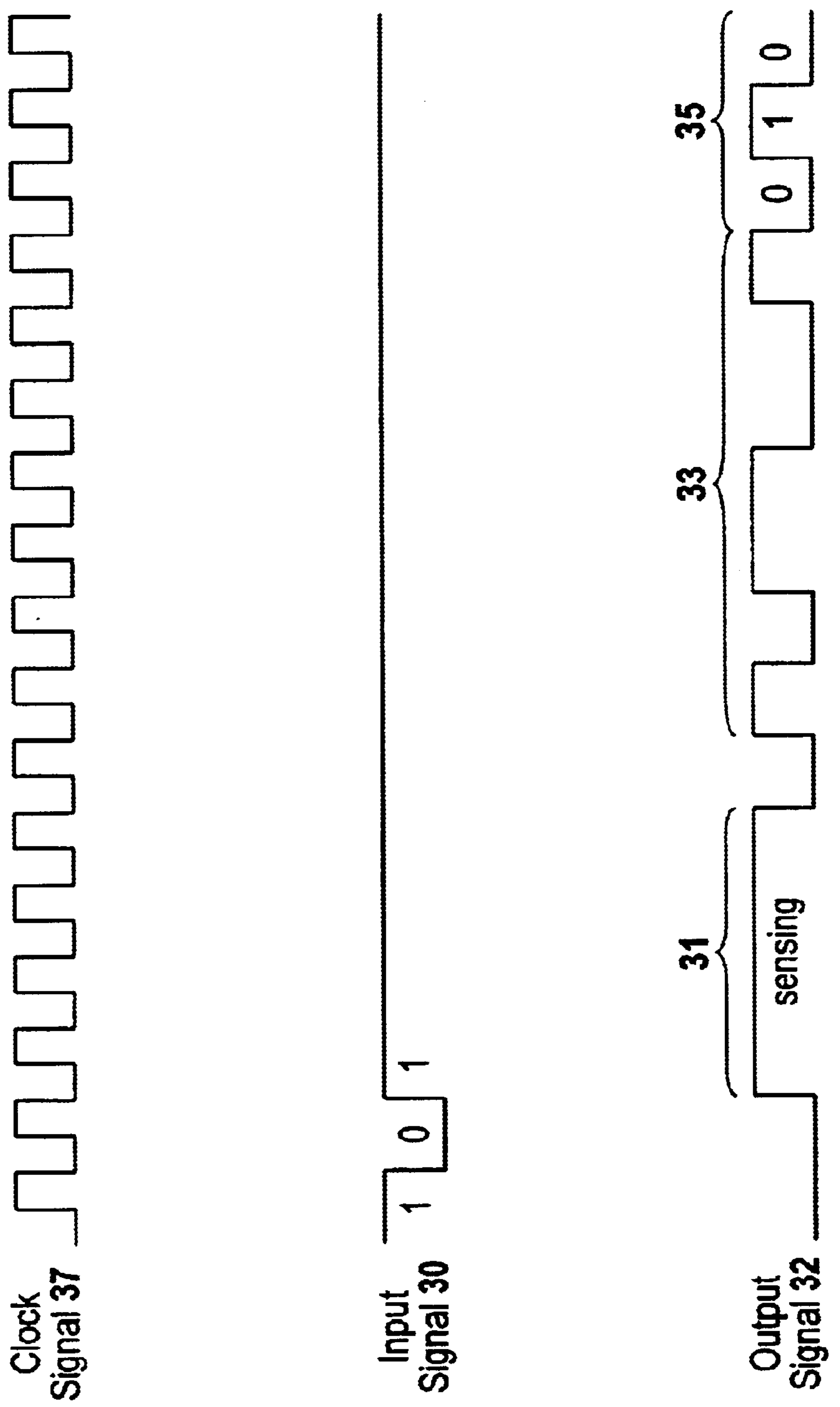
FIG. 2 illustrates a timing diagram suitable for practicing the illustrative embodiment of the invention.

FIG. 2 is a waveform diagram that illustrates the digital signals communicated to the input node 18, to the clock node 37, and from the output node 16. The input signal 30 acts as a reset signal to reset the sensor 14 and initiate a sensing operation by the sensor 14. The output signal 32 is a digital signal that toggles between a logic "0" level and a logic "1" level to communicate a first data value 31, a second data value 33 and a third data value 35 of the sensor 14 in serial fashion. Clock signal 37 asserted on clock node 24 is provided for illustrative purposes to help facilitate explanation of the invention and is not meant to limit the scope of the present invention. For example, those skilled in the art will readily recognize that the input signal 30 and the output signal 32 can transition states based on a rising edge of the clock signal 37 or a falling edge of the clock signal 37. Furthermore, those skilled in the art will readily recognize that the illustrated values the first data value 31, the second data value 33 and the third data value 35 are not limited by the number of clock cycles illustrated.

Figure 3:
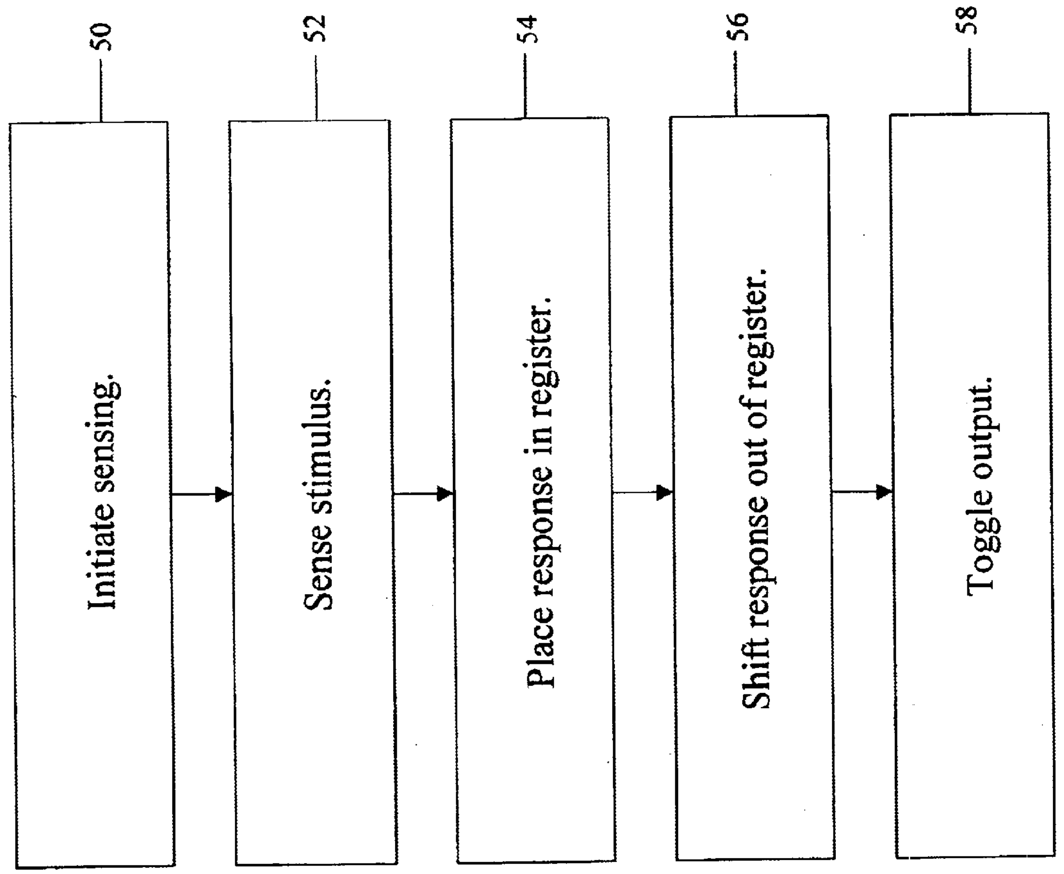
FIG. 3 is a flow diagram that depicts operation of the illustrative embodiment of the invention.

FIG. 3 illustrates the steps taken by the sensor 14 to report a sensed physical stimulus. Upon power up of the sensor 14, the state of the sensor is unknown. As such, the input signal 30 is held asserted to a logic level "0" at the input node 18 to force the sensor 14 to its initial or starting state. By forcing the sensor 14 to its starting state the content of the register 15 is reset. The sensor 14 remains in this state until the input signal 30 asserted at the input node 18 rises to a logic "1" level following at least one clock cycle of the clock signal asserted 37 on the clock input node 24. Those skilled in the art will recognize that sensor 14 can be configured so that when the input signal 30 is asserted to a logic "1" level at the input node 18 to force the sensor 14 to its initial or starting state. Moreover, those skilled in the art will recognize that the input signal 30 can be asserted to a logic "0" level at any time after the power on reset to again force the sensor 14 to its initial or starting state.

Once the input signal 30 rises to a logic "1" level on the input node 18, the sensor 14 initiates sensing a physical stimulus within the exemplary integrated circuit 12 to obtain an absolute or relative quantitative measurement (step 52 in FIG. 3). During the sensing process of the sensor 14, the input signal 30 at the input node 18 is held at a logic "1" level and the output signal 32 asserts the first data value 31 on the output node 16 (step 52 in FIG. 3). The logic "1" level of the first data valve 31 of the output signal 32 asserted on the output node 16 indicates that the sensor 14 is obtaining a measurement of a physical stimulus, such as the internal temperature of the exemplary integrated circuit 12. Those skilled in the art will recognize that the sensor 14 can be configured so as the output signal 32 asserts a logic "0" level on the output node 16 to provide the first data value that indicates that the sensor 14 is obtaining a measurement of a physical stimulus, such as the internal temperature of the exemplary integrated circuit 12. After a fixed number of clock cycles on the clock input node 24, the sensor 14 places a measurement value of the physical stimulus into the register 15 and deasserts the output signal 32 on the output node 16 for at least one clock cycle of the clock signal 37 asserted on the clock input node 24 (step 54 in FIG. 3).

After one clock cycle of the clock signal 37 on the clock input node 24, the sensor 14 shifts the second data value 33 representing the measured value of the physical stimulus out of the register 15 on the output node 16 at a rate of one bit per clock cycle on the clock input node 24 (step 56 in FIG. 3). When the sensor has emptied the register 15, the sensor 14 affixes the third value 35 to the response and asserts the third data value 35 on the output node 16 at the rate of one bit per clock cycle on the clock input node 24 (step 58 in FIG. 3). The third data value 35 provides an indication that the sensor 14 is functioning correctly. As the output signal 32 illustrates, the affixed third data value 35 corresponds to a 010 bit pattern. Nevertheless, those skilled in the art will recognize that the sensor 14 can affix an alternative bit pattern, such as 101 and the third data value 35 asserted by the sensor 14 can precede or follow the assertion of the second data value 33 representative of the measured value shifted out of the register 15. Moreover, those skilled in the art will recognize that the bit length of the second data valve 33 (i.e. measured response) can vary depending on the application, the accuracy required and the like.

While the present invention has been described with referenced to a preferred embodiment thereof, one skilled in the art will appreciate various changes in form and detail may be made without departing from the intended scope of the present invention as defined in the pending claims. The logic "0" levels refer to throughout this text refer to a voltage level that is approximately 0 volts and the "1" levels referred to throughout this text refer to a voltage level that is at least approximately 1.0 volts.

What is claimed is:

1. A thermal sensor in an integrated circuit comprising:

a register to hold a response of said thermal sensor; and an Input/Output (I/O) interface having an input node to receive an input trigger to trigger said thermal sensor to output on an output node of said interface an output signal that includes a first value that indicates said thermal sensor is sensing the temperature of said integrated circuit, a second value representative of said response held by said register, and a third value generated by said thermal sensor that indicates said thermal sensor is functioning properly.

2. The thermal sensor of claim 1, wherein said Input/Output interface comprises a digital Input/Output interface having at least one input node capable of receiving a digital input and at least one output node capable of asserting a digital output.

3. The thermal sensor of claim 2, wherein said input node and output node comprises at least two electrical contacts capable of providing an off chip interface.

4. The thermal sensor of claim 1, wherein said integrated circuit comprises a microprocessor.

5. The thermal sensor of claim 1, wherein said integrated circuit comprises a very large scale integration (VLSI) circuit.

6. The thermal sensor of claim 1, wherein said thermal sensor appends said value that indicates said thermal sensor is functioning properly to said response of said thermal sensor.

7. The thermal sensor of claim 1, wherein said thermal sensor is a calibrated sensor.

8. The thermal sensor of claim 1, wherein said thermal sensor is en active sensor.

9. In an integrated circuit having a thermal sensor, a method for said thermal sensor to provide an indication that said thermal sensor is functioning properly, the method comprising the steps of:

asserting an input signal at a first Input/Output pin of said thermal sensor to initiate thermal sensing of said integrated circuit by said thermal sensor;

sensing by said thermal sensor a temperature of said integrated circuit; and asserting an output signal on a second Input/Output pin of said thermal sensor by said thermal sensor wherein said output signal provides a first value indicating said thermal sensor is sensing said temperature, a second value representative of said temperature of said integrated circuit, and a third value that provides said indication that said thermal sensor is functioning properly.

10. The method of claim 9 further comprising the step of writing said temperature of said integrated circuit to a register of said thermal sensor.

11. The method of claim 9, further comprising the step of asserting a status signal on said second Input/Output pin of said thermal sensor during said step of sensing by said thermal sensor a temperature of said integrated circuit to indicate that said sensing is occurring.

12. The method of claim 9, wherein said output signal comprises a first portion and a second pin.

13. The method of claim 12, wherein said first portion of said output signal comprises a value representative of said temperature of said integrated circuit.

14. The method of claim 12, wherein said second portion of said output signal comprises a value representative of said indication that said thermal sensor is functioning properly.

15. The method of claim 13, wherein said value representative of said temperature indicates an absolute temperature.

16. The method of claim 13, wherein said value representative of said temperature indicates a relative temperature.

* * * * *